United States Patent [19]

Lowrance

[11] 3,885,025

[45] May 20, 1975

[54] PREPARATION OF BERYLLIUM HYDRIDE

[75] Inventor: Byron R. Lowrance, Baton Rouge, La.

[73] Assignee: Ethyl Corporation, New York, N.Y.

[22] Filed: Feb. 26, 1962

[21] Appl. No.: 176,865

[52] U.S. Cl............................... 423/645; 423/647
[51] Int. Cl............................................. C01b 6/04
[58] Field of Search ............... 23/204; 423/645, 647

[56] References Cited
OTHER PUBLICATIONS
Head et al., J. Am. Chem. Soc., 79, pp. 3687–3689 (1957).

*Primary Examiner*—Benjamin R. Padgett
*Assistant Examiner*—E. A. Miller
*Attorney, Agent, or Firm*—Donald L. Johnson; John F. Sieberth; Lewis Hess

EXEMPLARY CLAIM

1. A process for the preparation of beryllium hydride which comprises pyrolyzing, while in solution in a solvent inert, under the reaction conditions, with respect to reactants and products and at a temperature in the range of about 100° to about 200°C, sufficient to result in the formation of beryllium hydride, a di-t-alkyl beryllium etherate wherein each tertiary alkyl radical contains from 4 to 20 carbon atoms, the pyrolysis being carried out under an atmosphere inert, under the reaction conditions, with respect to reactants and products.

11 Claims, No Drawings

PREPARATION OF BERYLLIUM HYDRIDE

This invention relates to the provision of a novel and improved method for the preparation of beryllium hydride.

Beryllium hydride has been synthesized by Head, Holley, and Rabideau, [J. Am. Chem. Soc. 79, 3687 (1957)] using ether-free di-t-butyl beryllium and by Hellman and Mears (National Bureau of Standards, private communication). The latter investigators heated the di-t-butyl beryllium etherate to about 120°C under 60 mm pressure of nitrogen and these conditions were maintained for about 4 days until the compound became jelly-like. At this point the pressure was lowered to the limit of the pump and the temperature raised to 200°C over a period of about 2.5 hours and held there for an additional 1.5 hours. The flask was then cooled to 110–120°C and pumping was continued for 7 days. The product was a white porous mass which could be easily broken into a powder.

The foregoing methods suffered from the difficulty of removing ether and cleavage products from the highly immobile gel which is the primary product of those methods. Accordingly, it is an object of the present invention to provide a method of preparing beryllium hydride which does not suffer from the aforementioned difficulties. Another object of this invention is to provide a method for preparing beryllium hydride in high yield and in an easily recoverable form. Additional objects will appear hereinafter.

The process of the present invention comprises preparing beryllium hydride by the thermal decomposition, in solution in an inert solvent, of a di-t-alkyl beryllium etherate wherein each of the t-alkyl radicals contains 4 to 20 carbon atoms. Another embodiment of the present invention is the formation of beryllium hydride by the pyrolysis of di-t-butyl beryllium etherate in an inert solvent. Still another embodiment of this invention is the preparation of beryllium hydride by the pyrolysis of di-t-butyl beryllium diethyl etherate while in solution in an inert hydrocarbon solvent. Still other embodiments will appear hereinafter.

The method of beryllium hydride synthesis herein disclosed offers a number of distinct advantages over hitherto available methods. Thus, the use of a solvent increases the mobility of the reaction system by keeping the materials in a liquid phase until the beryllium hydride polymer has precipitated. Moreover, ether and cleavage products are more readily removed from the solution than from the highly immobile gel encountered when neat di-t-butyl beryllium etherate is pyrolyzed. Moreover, the presence of solvent vapors assists purification of the product by acting to strip volatiles from the system.

The invention will be more fully understood by reference to the following illustrative examples in which all parts and percentages are by weight.

EXAMPLE I

Di-t-butyl beryllium etherate, prepared by the reaction of tert-butyl Grignard reagent with beryllium chloride in diethyl ether solution, was pyrolyzed in an apparatus consisting of a reaction flask, a vent condenser designed to pass ether and lower boiling compounds and a pair of cold-traps in parallel followed by a gauge thermostat pump system. A three-way stop-cock directed the gas stream into one of the two traps during a measured time interval, then into the other trap for the next interval. Samples taken in this way were measured and identified throughout the course of the pyrolysis. The pyrolysis was carried out in normal decane as a solvent at a temperature of 120°C and under dry nitrogen at a pressure of 80 mm of mercury. This temperature was maintained for 4.5 hours after which it was increased to 150°C for a period of 2 hours. The product contained 49.3 percent of beryllium hydride as determined by measurement of the hydrogen evolved upon hydrolysis.

EXAMPLE II

Example I was repeated using n-tridecane as a solvent. Hydrogen pressures of 25 mm and temperatures of 120° to 130° and 160° to 170°C, respectively, for two successive 3.5 hour periods, were employed. The total yield of beryllium hydride in the two reaction stages amounted to 67.1 percent.

EXAMPLE III

The process of Example I was repeated using n-tridecane as solvent, temperatures of 125°–140° and 185°C, nitrogen pressures of 20 and 70 mm of mercury and reaction periods of 10 and 3 hours, respectively, for the two successive stages. The yield of beryllium hydride in the second stage was 43.7 percent.

EXAMPLE IV

The process of Example I was repeated using trimethylhexane as solvent, a reaction temperature of 150°C, a nitrogen pressure of 760 mm, and a reaction time of 8 hours. A 58 percent yield of beryllium hydride was obtained.

When other solvents such as dodecane, toluene, diphenylmethane, and N,N-dimethyl aniline, and temperatures ranging from 100° to 200°C were employed, similar results were obtained.

A considerable variety of organoberyllium compounds can be used in the practice of the present invention. Included are all beryllium alkyls having in each alkyl radical 4 to 18 carbon atoms and a tertiary carbon atom bonded to the beryllium atom. Examples of such compounds are bis(1,1-dimethylbutyl)beryllium, bis(1,1-dimethylhexyl)beryllium, bis(1,1-dimethyldecyl)beryllium, and bis(1,1-dimethyltetradecyl)beryllium. The ether of the etherate may be diethyl ether, dipropyl ether, dibutyl ether, dihexyl ether, or any similar ether containing not more than about 10 carbon atoms in each alkyl radical.

Among the criteria for the choice of solvents to be employed in the reaction of this invention are that the solvents be liquid under the reaction conditions and that they be inert to both reactants and products. Accordingly, the solvents may include aliphatic hydrocarbons, such as n-nonane, 2,2,4-trimethylhexane, n-decane, n-dodecane, n-tetradecane, n-cetane, and the like; aromatic hydrocarbons, such as toluene, o-xylene, cumene, mesitylene, and the like; and tertiary amine derivatives such as pyridine, quinoline, dimethyl aniline, and the like.

Of the foregoing solvents, the hydrocarbons are preferred because they yield a solid product directly, whereas, when amines are used, the products are obtained in solution therein, and the solvents must be separated to recover the products. Of the hydrocarbons, dodecane and toluene are preferred because of their ready availability.

The reactions of this invention may be carried out at any temperature, sufficient to result in the formation of beryllium hydride, which is within the liquid range of the solvents under the reduced pressures employed. In general, these temperatures fall in the range of 100° to 200°C. The precise temperature employed within this general range depends somewhat upon the identify of the particular di-tertiary-alkyl beryllium etherate undergoing reaction and, to a lesser extent, upon the solvent being used. However, it will be understood that temperatures somewhat above or below those discussed above may be used to obtain beryllium hydride in good yield.

The reactions of the invention usually proceed at satisfactory rates under reduced pressures of 10 to 300 mm of mercury, but pressures ranging from less than 5 mm of mercury to more than 1 atmosphere may be used, if desired.

The concentrations, employed in the pyrolysis, of dialkylberyllium etherate in the hydrocarbon or amine solvent may vary over the range of 2 to 25 percent by weight of the alkyl; concentrations of 5 to 10 percent by weight are preferred, because at these concentrations the reaction proceeds smoothly and at a satisfactory rate.

The reactions of the invention may be carried out under any atmosphere inert to both reactants and products. The use of dry nitrogen is preferred because of its availability and economy. Other suitable protective atmospheres include gaseous saturated hydrocarbons such as methane and ethane, and the noble gases, helium, neon, argon, krypton, and xenon.

The beryllium hydride obtained by the process of this invention is a useful intermediate in the preparation of beryllium alkyls by olefination. It can be used for the metal plating of suitable substrates by thermal decomposition under suitable conditions in contact with said substrates. It is useful as a source (by thermal decomposition) of pure metallic beryllium for use in alloys and as a chemical raw material.

Having thus described the process of this invention, it is not intended that it be limited except as set forth in the following claims.

I claim:

1. A process for the preparation of beryllium hydride which comprises pyrolyzing, while in solution in a solvent inert, under the reaction conditions, with respect to reactants and products and at a temperature in the range of about 100° to about 200°C, sufficient to result in the formation of beryllium hydride, a di-t-alkyl beryllium etherate wherein each tertiary alkyl radical contains from 4 to 20 carbon atoms, the pyrolysis being carried out under an atmosphere inert, under the reaction conditions, with respect to reactants and products.

2. The process of claim 1 wherein the tertiary alkyl radical is a t-butyl radical.

3. The process of claim 1 wherein the etherate is a diethyl etherate.

4. The process of claim 1 wherein the inert solvent is a saturated aliphatic hydrocarbon containing from 9 to 16 carbon atoms.

5. The process of claim 1 wherein the inert solvent is n-tridecane.

6. The process of claim 1 wherein the inert solvent is trimethylhexane.

7. The process of claim 1 wherein the inert solvent is n-decane.

8. The process of claim 1 wherein the pyrolysis is carried out under an inert atmosphere.

9. The process of claim 1 wherein the pyrolysis is carried out under an atmosphere of dry nitrogen.

10. The process of claim 1 wherein the concentration of di-t-alkyl beryllium etherate in the inert solvent is from about 5 to about 10 weight percent, based on the solvent.

11. In a method for preparing beryllium hydride which comprises subjecting to pyrolysis an ether solution of a di-t-alkyl beryllium compound, the improvement comprising effecting the pyrolysis by introducing the di-t-alkyl beryllium solution into an inert liquid hydrocarbon heated to a temperature between about 120°C. and about 200°C.

* * * * *